United States Patent Office 3,484,506
Patented Dec. 16, 1969

3,484,506
BISPHENOL BISPHOSPHITES AND METHOD OF MANUFACTURE THEREOF
Charles F. Baranauckas and Irving Gordon, Niagara Falls, N.Y., assignors to Hooker Chemical Corporation, Niagara Falls, N.Y., a corporation of New York
No Drawing. Filed Oct. 31, 1961, Ser. No. 148,802
Int. Cl. C07f *9/12;* C08f *45/58;* C08k *1/60*
U.S. Cl. 260—930                              15 Claims

ABSTRACT OF THE DISCLOSURE

Bisphenol bisphosphites of the formula

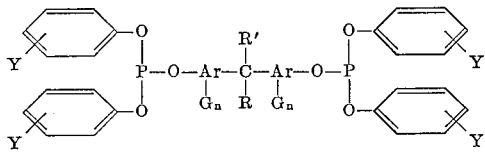

wherein Ar is phenylene, R and R' are either hydrogen, alkyl, haloalkyl or aryl, G is either alkyl, halogen or nitro,

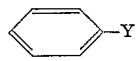

is either phenyl, tertiary butyl phenyl, octyl phenyl or nonyl phenyl, and $n$ is a number from 0 to 4. These compounds are useful as stabilizers for polymeric materials such as vinyl resins, synthetic rubbers or polyurethanes. They may be made by reaction of phosphorus trihalide with a bisphenol, followed by subsequent reaction with a phenol.

---

This invention relates to new compositions of matter and their methods of manufacture. More specifically, the inventive concept of the present invention resides in the novel production and structure of various bisphosphites.

In order that the invention be more easily understood, it will be described with reference to a general formula. The compounds of this invention generally may be represented by the following formula:

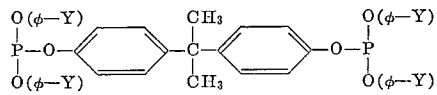

where —ϕ—Y is selected from the group consisting of phenyl, t-butylphenyl (tertiary butylphenyl), octyl phenyl, nonyl phenyl and mixtures thereof.

The above compositions mentioned have exhibited valuable utility as heat stabilizers for vinyl and other type resins.

Novel methods of preparing the compounds of this invention are illustrated by the following equations:

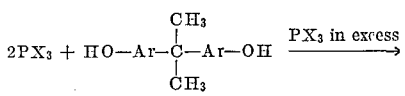

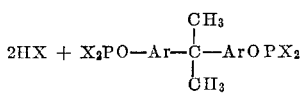

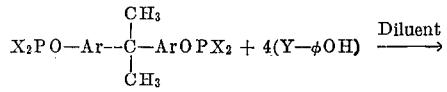

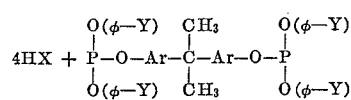

where Ar is an aromatic nucleus; X is a halogen; and —ϕ—Y is selected from the group consisting of phenyl, t-butylphenyl, octyl phenyl, nonyl phenyl and mixtures thereof.

Although the above method encompasses the general novel method of this invention, the present invention will hereinafter be described throughout this disclosure with reference to preferred species included in the above generic formulas.

(1) PCl₃ will be the specific compound used to illustrate the above generic term PX₃.

(2) Bisphenol-A having the formula

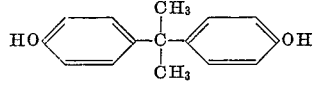

will be the specific compound used to illustrate the above generic term

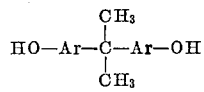

(3) HCl will illustrate the term HX.
(4)

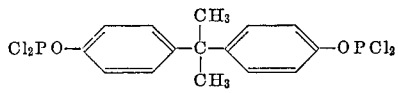

will be the specific structure used to illustrate the generic structure:

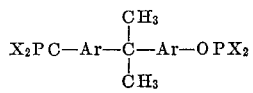

(5)

will be the specific formula used to illustrate the generic formula: Y—ϕOH.
(6)

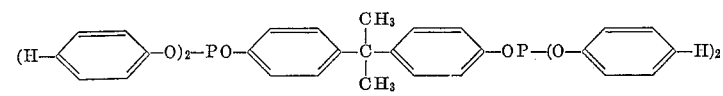

will be the specific formula used to illustrate and represent the generic formula:

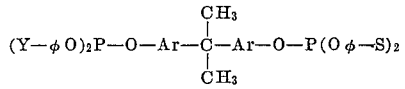

Although these specific preferred compounds will be used throughout this disclosure to represent the generic compound groups of this invention, the invention is not to be understood to be limited to these specific compounds. For example, some of the alkylated phenols that may be used under the general formula Y—ϕ—OH above, are tertiary butyl phenols, para-tertiary butyl phenols, para-octyl phenols, para-nonyl phenols, para-decyl phenols, ortho-, meta- or para- cresol, xylenols, (the 2,4; 3,4; 2,5; or 3,5 isomers thereof), propyl phenols, isopropyl phenols, butyl phenols, secondary butyl phenols, amyl phenols, hexyl phenols, heptyl phenols, amol, eugenol, saligenin, thymol, and the like.

Some of the bisphenols that may be used in place of the bisphenol-A of this invention under (2) above are bisphenol B(4,4' - sec - butylidenediphenol), bisphenol F(4,4'-methylenediphenol); 4,4'-methylenediphenol, 2,2'-methylenediphenol; 2,4'-ethylidenediphenol; 4,4'-propylidene diphenol; 2,2'-propylidene diphenol; 2,4'-propylidene diphenol; 4,4'-(3-pentylidene)diphenol; 4,4',2,2'- or 2,4'-(2-hexylidene)diphenol; 4,4'- 2,2'- or 2,4'-(3-heptylidene)diphenol; 4,4'- 2,2'-, or 2,4'-(1,1,1-trichloro-2-ethylidene)diphenyl; 4,4'- 2,2'-, or 2,4'-benzylidenediphenol; 4,4',- 2,2'- or 2,4'-propenylidenediphenol; 4,4'-, 2,2'-, or 2,4'-benzhydrylidene diphenol and the like. The general structure of bisphenols that may be used in the process in place of the biphenol-A of this invention can be illustrated as follows:

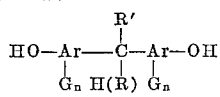

wherein:
Ar is an aromatic nucleus,
R and R' are hydrogen, alkyl, aryl, heteroaryl alkylaryl, cycloalkyl and the like;
G is alkyl, halogen, nitro, or other substituents and
$n$ is a numerical value from 0–4.

Bisphenol-A bisphosphites are prepared by a two-step reaction, $PCl_3$ plus bisphenol-A followed by the reaction of the resultant acid chloride with a phenol or substituted phenol. As indicated above, the novel final reaction products have utility as stabilizers for vinyl resins, synthetic rubbers, or polyurethanes.

Typical methods of preparing the final product compounds of this invention and their use as intermediates are illustrated by the following examples.

EXAMPLE 1

Bisphenol-A (one mole ratio) was slowly added to the $PCl_3$ (ten mole ratio) maintained at a temperature of seventy degrees centigrade, with vigorous stirring. A slight nitrogen ($N_2$) ebullition was employed to disengage the hydrogen chloride (HCl) of reaction. The reaction mixture was held at seventy to eighty degrees centigrade throughout the additional period (one hour for a one mole bisphenol-A run) and for a final reaction period of one hour at eighty degrees centigrade with nitrogen ($N_2$) evolution. Diluent toluene was added equal to one-half weight of the starting $PCl_3$. The excess $PCl_3$ and toluene were vacuum distilled, using a small Vigreaux column (less than three plates) at ultimate conditions of seventy-five degrees centigrade in the pot at ten millimeters of mercury pressure. The novel intermediate bis (dichlorophosphite) was obtained in nearly theoretical yield (one mole ratio).

The intermediate bis(dichlorophosphite) was dissolved in half its weight of toluene and added to the appropriate phenol (four mole ratios) dissolved in half its weight of toluene and held at eighty degrees centigrade. Vigorous stirring and nitrogen ebullition were used. After the addition period (one hour for a one mole reaction), a one hour finishing period at one hundred degrees centigrade was used to complete the HCl evolution. The toluene diluent was vacuum distilled at ultimate conditions of eighty degrees centigrade pot/ten millimeters. The product, a tetraphenyl-bisphenol-A-bisphosphite, a viscous liquid, was obtained in nearly quantitative yield and was mixed with filter aid and filtered before packing. The phosphorus trichloride ($PCl_3$)/toluene and toluene distillates may be refractionated, if necessary, and recycled into future reactions.

Using the above preferred procedure, the conditions thereof were modified accordingly to determine working ranges within which the present novel process will function. While the above conditions are preferred, it was found that satisfactory results were obtained within certain ranges. It was found that the bisphenol-A-$PCl_3$ mixture may be held at a temperature of from about twenty-five to eighty degrees centigrade during the addition of the $PCl_3$. The reaction was held at from about twenty-five to about eighty degrees centigrade throughout the addition period. The final reaction period was from about one-half to five hours at from about twenty-five to about eighty degrees centigrade. In place of the preferred toluene, other conventional diluents as benzene, xylene, petroleum ether, etc., may be used in an amount equal to from one-tenth to ten times the weight of the starting $PCl_3$. The intermediate bis(dichlorophosphite) was dissolved in from about one-quarter to four times its weight of toluene and held at from about twenty-five to eighty degrees centigrade. After the addition period, a one-half to two hour finishing period at about from twenty-five to one hundred degrees centigrade, was used to complete the HCl evolution. While in the above preferred method a near quantitative yield of the product resulted, the ranges specified herein gave better than average yields.

A general equation for the above procedure follows:

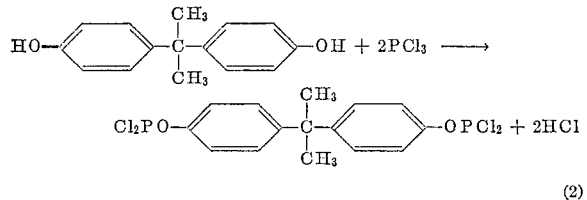

(2)

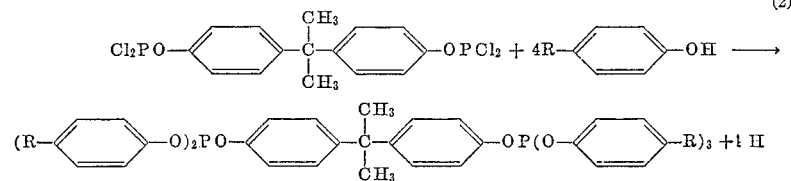

Equation 1 represents the reaction of two moles of phosphorus trichloride with one mole of bisphenol-A to produce the corresponding novel tetrachloro bisphenol-A bisphosphite.

Equation 2 represents the reaction of the chlorophosphite with phenol or an alkylated phenol to form the corresponding novel tetraphenyl or tetra-alkyl phenyl bisphenol-A bisphosphite.

EXAMPLE 2

Part 1 of this reaction was run in excess $PCl_3$. Ten moles of $PCl_3$, thirteen hundred and seventy-five grams, were heated to seventy-five degrees centigrade in the reaction pot. One-half mole (one hundred and fourteen grams) of bisphenol-A was added slowly to the $PCl_3$ (over one hour), and the theoretical amount of HCl was evolved. An amount of toluene equal in weight to the $PCl_3$ charged was added to the reaction flask and the excess $PCl_3$ was distilled off under vacuum, followed by the toluene. The resulting acid chloride compound was diluted with an equal weight of toluene and placed in a one-liter addition funnel. For the second part of this reaction, 2.04 moles of nonyl phenol were dissolved in an equal weight of toluene and heated to eighty degrees centigrade in the reaction flask. The acid chloride solution was added slowly to this mixture and the theoretical amount of HCl was evolved. The toluene diluent was removed under vacuum (pot to one hundred degrees, vacuum of nine mm. Hg), leaving the tetranonylphenyl bisphenol-A bisphosphite as a residue in nearly theoretical yield containing nearly the theoretical amount of P. Infra-red analysis confirmed the qualitative identity of this structure.

EXAMPLE 3

Using the same intermediate tetrachloro bisphenol-A bisphosphite, a similar preparation to the above was carried out using tert-butylphenol rather than nonylphenol to form the corresponding tetra - (tert-butylphenyl)bisphenol-A bisphosphite (a viscous fluid), in nearly theoretical yield, containing nearly the theoretical amount phosphorus. Infrared analysis confirmed the qualitative identity of this structure.

EXAMPLE 4

Using the same intermediate tetrachloro bisphenol-A bisphosphite a similar preparation to the above was carried out using phenol rather than an alkylated phenol to form the corresponding tetraphenol bisphenol-A bisphosphite in nearly theoretical yield containing nearly the theoretical amount of phosphorus. Infra-red analysis confirmed the qualitative identity of this structure.

EXAMPLE 5

Using the same intermediate tetrachloro bisphenol-A bisphosphite, a similar preparation to the above was carried out using octylphenol rather than phenol to form the corresponding tetraoctylphenyl bisphenol-A bisphosphite in nearly theoretical yield, containing nearly the theoretical amount of phosphorus. Infra-red analysis confirmed the qualitative identity of this structure.

EXAMPLE 6

The final product compositions of this invention have extremely desirable utility as stabilizers for vinyl resins and other resin systems.

All the stability tests were effected using the following basic formulation: Fifty grams polyvinyl chloride; 22.5 grams di-2-ethylhexyl phthalate; and one gram barium cadmium laurate (approximately 0.018 gram of P contained in the phosphite or phosphorus compound to be tested).

Bisphenol bisphosphites 0.19 gram tetraphenyl-bisphenol-A bisphosphite.

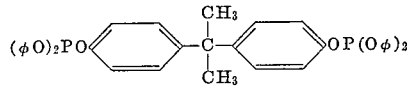

or 0.26 gram tetra-t-butylphenyl bisphenol-A bisphosphite

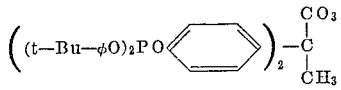

or 0.28 gram terta-octyl phenyl bisphenol-A bisphosphite

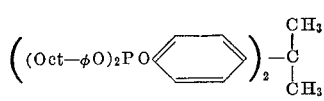

or 0.33 gram tetra-nonyl phenyl bisphenol-A bisphosphite

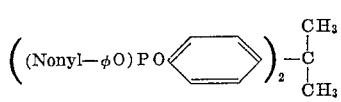

Preparation of sample for test

The sample of the bisphosphite to be tested was weighed and dissolved directly in the di-2-ethylhexyl phthalate. The barium cadmium laurate and the polyvinyl chloride were now added and mixed in. Controls were made up at the same time which contained no phosphorus compound.

Milling the test sample

The above mixtures were now milled on a small rubber mill set at three-hundred degrees Fahrenheit, with a mixing time of about three minutes and a milling time of about five minutes. A polyvinyl chloride film of about forty-five mils thickness is produced.

Heating (accelerated aging test)

The milled sheets were cut into three-quarter inch by one and one-quarter inch rectangles, placed on a four by four inch glass plate, and placed in a three hundred and fifty degree Fahrenheit oven. Samples (plate by plate) were removed from the oven at fifteen minute intervals up to one hundred and fifty minutes. The cooled samples were then examined and visual comparisons of color development were made. Lack of color development is a measure of stabilizing efficiency.

Interpretation

An examination of the table below indicates the utility of these bisphenol bisphosphites, (isoalkylidene bis(o- or p-substituted aryl) tetra(substituted phenyl) diphosphites, as vinyl stabilizers. The controls (containing no phosphorus additives) were spotted after forty-five minutes and black thereafter, whereas the bisphenol bisphosphite treated vinyl strips were colorless until about one hundred and twenty to one hundred and fifty minutes, when they spotted. In addition, the tetraphenyl bisphenol-A bisphosphite treated vinyl strip was only spotted at one hundred and fifty minutes—it never blackened.

RESULTS OF ACCELERATED AGING TEST (350° F.)

| Sample | Minutes to Spotting | Minutes to Blackening |
|---|---|---|
| Control | 45 | 90 |
| Tetraphenyl bisphenol-A bisphosphite | 150 | >150 |
| Tetra-tert-butyl phenyl bisphenol-A bisphosphite | 120 | 150 |
| Tetra-octyl phenyl bisphenol-A bisphosphite | 120 | 150 |
| Tetra-nonyl phenyl bisphenol-A bisphosphite | 120 | 150 |

Although this invention has been illustrated and defined herein in terms of the above examples, it is to be understood that these are by no means all-inclusive. Various modifications to the invention herein set out will suggest themselves to those skilled in the art. These are intended to be comprehended within the spirit of this invention.

We claim:

1. The composition having the general formula

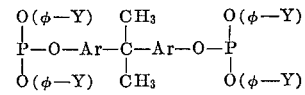

where ($\phi$—Y) is selected from the group consisting of phenyl, t-butylphenyl, octyl phenyl, nonyl phenyl and mixtures thereof, and Ar is selected from the group consisting of phenylene and substituted phenylene.

2. The composition of claim 1 wherein Ar is phenylene.

3. The composition of claim 2 wherein $\phi$—Y is nonyl phenyl.

4. The composition of claim 2 wherein $\phi$—Y is phenyl.

5. The composition of claim 2 wherein $\phi$—Y is t-butylphenyl.

6. The composition of claim 2 wherein $\phi$—Y is octyl phenyl.

7. A compound of the formula

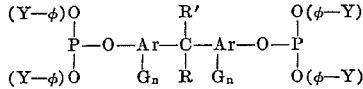

wherein Ar is phenylene, R and R' are selected from the group consisting of hydrogen, alkyl, haloalkyl and aryl, G is selected from the group consisting of alkyl, halogen and nitro, n is a numerical value from 0–4, and φ—Y is selected from the group consisting of phenyl, t-butylphenyl, octylphenyl, nonylphenyl and mixtures thereof.

8. A compound of the formula

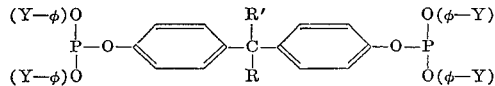

wherein R and R' are selected from the group consisting of hydrogen, alkyl of 1 to 4 carbon atoms, haloalkyl of 1 to 4 carbon atoms, and φ—Y is selected from the group consisting of phenyl, t-butylphenyl, octylphenyl, nonylphenyl and mixtures thereof.

9. A composition of the formula

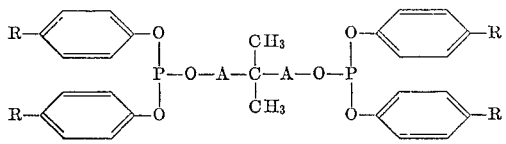

where R is selected from the group consisting of hydrogen and alkyl and A is selected from the group consisting of phenyl and phenyl having from 1 to 4 halogen atoms of atomic number from 17 to 35.

10. A compound of the formula

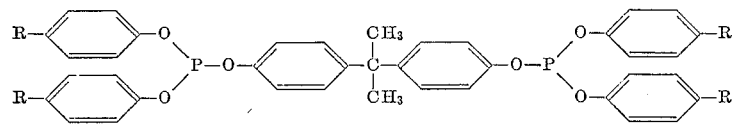

where R is selected from the group consisting of hydrogen and alkyl.

11. A composition of the formula

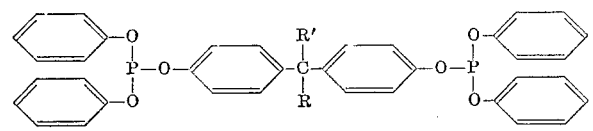

wherein R and R' are selected from the group consisting of hydrogen and lower alkyl.

12. A method for the production of the composition of claim 1 which comprises contacting an excess of a composition having the formula $PX_3$ with a composition having the formula

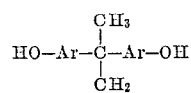

thereby forming a resulting composition having the formula

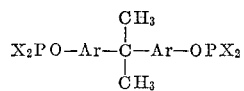

contacting said resulting composition with a composition having the formula Y—φOH thereby forming the desired product; wherein the above Ar is selected from the group consisting of phenylene and substituted phenylene, X is a halogen, and Y—φ is selected from the group consisting of phenyl, t-butylphenyl, octyl phenyl, nonyl phenyl, and mixtures thereof.

13. The method of claim 12 wherein an excess of up to 20 molar proportions of the composition $PX_3$ is used.

14. The method of claim 13 whereby the excess $PX_3$ is removed after the formation of said resulting composition.

15. A method for the production of a compound of claim 7, which comprises contacting an excess of $PX_3$ with

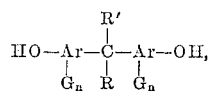

thereby forming

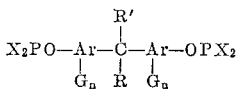

contacting the resulting phosphorodihalodite with Y—φOH, to form the desired product, wherein X is a halogen, and Ar, R, R', G, φ—Y and n are as described in claim 7.

References Cited

UNITED STATES PATENTS

| | | |
|---|---|---|
| 2,234,379 | 3/1949 | Martin. |
| 2,520,090 | 8/1950 | Barrett. |
| 2,643,265 | 6/1953 | Fon Tox. |

CHARLES B. PARKER, Primary Examiner

R. L. RAYMOND, Assistant Examiner

U.S. Cl. X.R.

260—45.7, 973, 976

PO-1050
(5/69)

UNITED STATES PATENT OFFICE
CERTIFICATE OF CORRECTION

Patent No. 3,484,506         Dated  December 16, 1969

Inventor(s)  Charles F. Baranauckas and Irving Gordon

It is certified that error appears in the above-identified patent and that said Letters Patent are hereby corrected as shown below:

Column 2, line 42, delete "$X_2PC$", and insert -- $X_2PO$ --;
Column 3, line 10, delete "4,4', 2,2'-" and insert -- 4,4'-, 2,2'- --;
Column 3, line 13, delete "4,4',-" and insert -- 4,4'-, --;
Column 4, line 34, insert Equation "(1)"; Column 4, line 45, delete "-R)$_3$ + 1H" and insert -- R)$_2$ + 4 HCl --; Column 5, line 55, delete $$\begin{array}{c} CO_3 \\ | \\ -C \\ | \\ CH_3 \end{array}$$ " and insert -- $$\begin{array}{c} CH_3 \\ | \\ -C \\ | \\ CH_3 \end{array}$$ --.

Column 5, line 67, delete "O)PO" and insert -- O)$_2$ PO --;

Column 7, line 52, delete

" $$\begin{array}{c} CH_3 \\ | \\ C \\ | \\ CH_2 \end{array}$$ " and insert -- $$\begin{array}{c} CH_3 \\ | \\ C \\ | \\ CH_3 \end{array}$$ --.

Column 8, line 19, delete "Amethod" and insert -- A method ---;

SIGNED AND
SEALED
NOV 5 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,484,506  Dated  December 16, 1969

Inventor(s)  Charles F. Baranauckas and Irving Gordon

It is certified that error appears in the above-identified patent and that said Letters Patent are hereby corrected as shown below:

Column 2, line 60, delete "$P(O\phi\text{-}S)_2$" and insert --- $P(O\phi\text{-}Y)_2$ ---.

Signed and sealed this 20th day of April 1971.

(SEAL)
Attest:

EDWARD M. FLETCHER, JR.　　　　　　WILLIAM E. SCHUYLER, JR.
Attesting Officer　　　　　　　　　Commissioner of Patents